(12) United States Patent
Verbeke et al.

(10) Patent No.: US 10,685,550 B2
(45) Date of Patent: Jun. 16, 2020

(54) GESTURE-ENABLED AUDIO DEVICE WITH VISIBLE FEEDBACK

(71) Applicant: Harman International Industries, Incorporated, Stamford, CT (US)

(72) Inventors: Joseph Verbeke, Mountain View, CA (US); Davide Di Censo, Sunnyvale, CA (US); Daniel Pye, Mountain View, CA (US); Stefan Marti, Oakland, CA (US); Carsten Schwesig, San Francisco, CA (US); Hakim Raja, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/301,424

(22) PCT Filed: May 19, 2017

(86) PCT No.: PCT/US2017/033671
§ 371 (c)(1),
(2) Date: Nov. 13, 2018

(87) PCT Pub. No.: WO2017/201492
PCT Pub. Date: Nov. 23, 2017

(65) Prior Publication Data
US 2019/0287380 A1    Sep. 19, 2019

Related U.S. Application Data

(60) Provisional application No. 62/339,044, filed on May 19, 2016.

(51) Int. Cl.
*G08B 21/22* (2006.01)
*H04R 1/02* (2006.01)
(Continued)

(52) U.S. Cl.
CPC .............. *G08B 21/22* (2013.01); *G01B 11/00* (2013.01); *G05B 11/01* (2013.01); *G06F 3/01* (2013.01);
(Continued)

(58) Field of Classification Search
CPC .... G08B 21/22; H04R 1/028; H05B 33/0854; H05B 33/0863; H05B 37/0227; H05B 37/0272
(Continued)

(56) References Cited

U.S. PATENT DOCUMENTS 6,882,331 B2   4/2005   Wu et al.
7,264,377 B2   9/2007   Cooper et al.
(Continued)

OTHER PUBLICATIONS

International Search Report for Application No. PCT/US2017/033671, dated Aug. 22, 2017.
(Continued)

*Primary Examiner* — Kerri L McNally
(74) *Attorney, Agent, or Firm* — Artegis Law Group, LLP

(57) ABSTRACT

An audio device includes a sensor communicatively coupled to a processor and configured to generate a presence signal in response to detecting an object within an interaction region, a loudspeaker communicatively coupled to the processor, at least one light-emitting device that is communicatively coupled to the processor, and the processor. The processor is configured to vary light output of the at least one light-emitting device based on the presence signal.

20 Claims, 5 Drawing Sheets

(51) Int. Cl.
  *G01B 11/00* (2006.01)
  *G06F 3/01* (2006.01)
  *H04R 3/00* (2006.01)
  *G08C 17/02* (2006.01)
  *G05B 11/01* (2006.01)
  *H05B 45/10* (2020.01)
  *H05B 45/20* (2020.01)
  *H05B 47/19* (2020.01)
  *H05B 47/105* (2020.01)

(52) U.S. Cl.
  CPC ............. *G08C 17/02* (2013.01); *H04R 1/028* (2013.01); *H04R 3/00* (2013.01); *H05B 45/10* (2020.01); *H05B 45/20* (2020.01); *H05B 47/105* (2020.01); *H05B 47/19* (2020.01); *G08C 2201/32* (2013.01); *G08C 2201/50* (2013.01); *G08C 2201/91* (2013.01); *H04R 2420/07* (2013.01)

(58) Field of Classification Search
  USPC ....................................................... 340/686.6
  See application file for complete search history.

(56) References Cited

U.S. PATENT DOCUMENTS

| | | | |
|---|---|---|---|
| 8,485,691 B2 | 7/2013 | Hamel et al. | |
| 8,923,995 B2 | 12/2014 | Lindahl et al. | |
| 9,122,451 B2 | 9/2015 | Calatayud | |
| 9,195,432 B2 | 11/2015 | Reilly | |
| 9,225,307 B2 | 12/2015 | Reilly et al. | |
| 9,304,736 B1* | 4/2016 | Whiteley | G06Q 20/40145 |
| 2006/0161870 A1 | 7/2006 | Hotelling et al. | |
| 2012/0089948 A1* | 4/2012 | Lim | G06F 3/017 |
| | | | 715/846 |
| 2013/0135188 A1 | 5/2013 | Yin et al. | |
| 2013/0154930 A1 | 6/2013 | Xiang et al. | |
| 2014/0045547 A1 | 2/2014 | Singamsetty et al. | |
| 2014/0266757 A1* | 9/2014 | Luna | G08B 21/18 |
| | | | 340/686.6 |
| 2014/0368423 A1* | 12/2014 | Brenckle | G06F 3/017 |
| | | | 345/156 |
| 2015/0193193 A1 | 7/2015 | Khaira et al. | |
| 2015/0247926 A1 | 9/2015 | Alameh et al. | |
| 2015/0338916 A1* | 11/2015 | Priyantha | G06F 3/017 |
| | | | 345/173 |
| 2016/0282934 A1* | 9/2016 | Willis | H04L 9/3231 |

OTHER PUBLICATIONS

Metzger et al. FreeDigiter: A Contact-Free Device for Gesture Control. Eighth International Symposium on Wearable Computers, dated Jan. 4, 2004, 5 pages.

Extended European Search Report for EP application No. 17800303.4 dated Oct. 23, 2019.

* cited by examiner

GESTURE-ENABLED AUDIO DEVICE WITH VISIBLE FEEDBACK

CROSS-REFERENCE TO RELATED APPLICATIONS

The present application is a national stage application of the international application titled, "GESTURE-ENABLED AUDIO DEVICE WITH VISIBLE FEEDBACK," filed on May 19, 2017 and having application number PCT/US2017/033671, which claims priority benefit of the U.S. Provisional Patent Application titled, "HARDWARE LAYOUT AND PHYSICAL ARCHITECTURE FOR A GESTURE ENABLED AUDIO DEVICE," filed on May 19, 2016 and having Ser. No. 62/339,044. The subject matter of these related applications is hereby incorporated herein by reference.

BACKGROUND

Field of the Claimed Embodiments

Embodiments of the present invention relate generally to audio devices and, more specifically, to a gesture-enabled audio device with visible feedback.

Description of the Related Art

Many mobile computing devices are now equipped with microphones and powerful processors. As a result, voice-enabled consumer devices have come into widespread use. For example, voice-control home automation systems, smartphones, smart speakers, and electronic tablets that are programmed with an intelligent personal assistant (IPA) are currently popular consumer products. Such voice-enabled consumer devices allow certain tasks to be performed for a user based on spoken requests, thereby circumventing the need for the user to provide manual input via a button, control knob, touchscreen, keyboard, mouse, or other input device. For example, using voice commands, a user can modify an output volume of a smart speaker, select a song to be played by a smart speaker, open automated window blinds, control a voice-enabled home appliance, etc. Thus, voice-enabled devices are well-suited for assisting a user in situations in which the user has dirty or wet hands, such as when the user is in a kitchen or garage, or where touching the device could be unhygienic or require the device to be cleaned and disinfected, such as when the user is in a sterile or semi-sterile environment.

However, voice control of electronic devices also has drawbacks. Specifically, when multiple voice-enabled devices are located proximate to each other (e.g., in the same or adjoining rooms), user voice commands intended for one voice-enabled device may be received, interpreted, and acted upon by a different voice-enabled device. Furthermore, voice-enabled devices are inherently language specific, and therefore can have limited use for anyone who cannot speak a language for which a voice-enabled device is programmed to understand.

To address these issues, gesture-enabled devices have been developed that allow a user to issue commands to such a device via hand, finger, and/or facial gestures. However, current gesture-based command systems are unreliable, both because they frequently fail to recognize gestures performed by a user, and because it is difficult for a user to determine whether a gesture has been recognized by the device.

Accordingly, improved techniques for non-manual interactions with electronic devices would be useful.

SUMMARY

The various embodiments set forth an audio device that includes a sensor communicatively coupled to a processor and configured to generate a presence signal in response to detecting an object within an interaction region, a loudspeaker communicatively coupled to the processor, at least one light-emitting device that is communicatively coupled to the processor, and the processor, where the processor varies light output of the at least one light-emitting device based on the presence signal.

At least one advantage of the disclosed embodiments is that a user can more effectively interact with a device via gestures, since the user can determine at a glance whether the user's current position relative to a gesture-enabled audio device will allow gesture-based inputs to the gesture-enabled device. A further advantage is that gesture-based interactions with a gesture-enabled audio device are more reliable due to the visual feedback provided by the device. For example, the visual feedback can confirm recognition of a gesture as an input and/or indicate which command has been received by the device.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
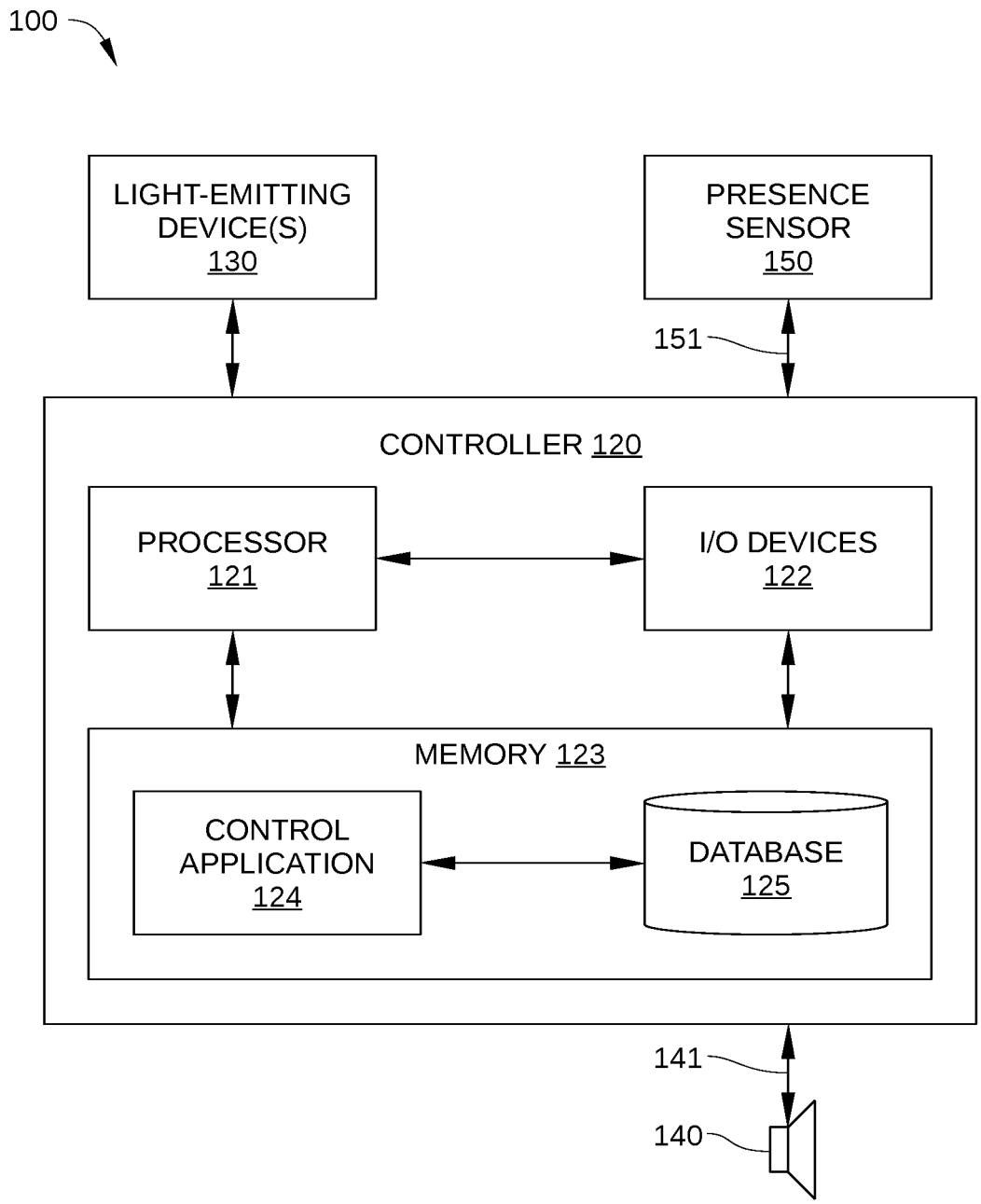
FIG. 1 is a conceptual block diagram of a gesture-enabled audio system, according to one or more embodiments of the present disclosure.

FIG. 1 is a conceptual block diagram of a gesture-enabled audio system 100, according to one or more embodiments of the present disclosure. Gesture-enabled audio system 100 is an audio system that is configured to detect the physical presence of a user and/or configured to detect a user gesture.

The gesture-enabled audio system 100 is further configured to generate a light output to the user, via one or more light-emitting devices, in response to the user and/or user gesture. In some embodiments, the light output of the light-emitting device(s) is varied as a function of the detected proximity of the user. Alternatively or additionally, in some embodiments, the light output of the light-emitting device(s) is varied to provide a particular light output based on a detected user gesture. Furthermore, in some embodiments, gesture-enabled audio system 100 is configured to generate a specific audio output based on a detected user gesture, such as an audible cue indicating that a particular user gesture has been detected and recognized by gesture-enabled audio system 100.

As shown, gesture-enabled audio system 100 includes a controller 120, at least one light-emitting device 130, one or more loudspeakers 140 communicatively coupled to controller 120 via a connection 141, and a presence sensor 150 communicatively coupled to controller 120 via a connection 151. In some embodiments, all of the above components of gesture-enabled audio system 100 are included within a single housing, such as when gesture-enabled audio system 100 is configured as a smart speaker or other self-contained gesture-enabled device. In other embodiments, one or more components of gesture-enabled audio system 100 may be disposed outside of a common housing of gesture-enabled audio system 100. For example, and without limitation, in some embodiments, loudspeaker 140 may include one or more Bluetooth-enabled speakers, in which case connection 141 includes a wireless connection, such as a Bluetooth connection, a Bluetooth low energy (BLE) connection, a WiFi connection, or the like. Alternatively or additionally, in some embodiments, presence sensor 150 may be a wearable computing device, such as a smartwatch or smart ring, or some other sensor capable of providing location and/or gestural information to controller 120. In such embodiments, connection 151 includes a wireless connection, such as a Bluetooth connection, a BLE connection, a WiFi connection, and the like.

Controller 120 is a computing device that includes a processor 121, input/output (I/O) devices 122, and a memory 123. Generally, controller 120 is configured to coordinate the overall operation of gesture-enabled audio system 100. In some embodiments, controller 120 may be communicatively coupled to but separate from other components of gesture-enabled audio system 100. In such embodiments, gesture-enabled audio system 100 may include a separate processor that receives data acquired from the surrounding environment and transmits data to the controller. In such embodiments, controller 120 may be included in a separate device, such as a personal computer, wearable device, smartphone, portable media player, etc. However, the embodiments disclosed herein contemplate any technically feasible system configured to implement the functionality of gesture-enabled audio system 100.

Processor 121 may be any technically feasible form of processing device configured to process data and execute program code. Processor 121 may include, for example, and without limitation, one or more of a system-on-chip (SoC), a central processing unit (CPU), a graphics processing unit (GPU), an application-specific integrated circuit (ASIC), a digital signal processor (DSP), a field-programmable gate array (FPGA), and so forth. In general, processor 121 may be any technically feasible hardware unit capable of processing data and/or executing software applications, including a control application 124. Further, in the context of this disclosure, controller 120 may include a physical computing system (e.g., a system in a data center) or may be a virtual computing instance executing within a computing cloud. In such embodiments, control application 124 may be implemented via a virtual computing instance executing within a computing cloud or server.

Memory 123 includes a control application 124 configured to interact with a database 125. Memory 123 may include a memory module or a collection of memory modules. The control application 124 within memory 123 is executed by processor 121 to implement the overall functionality of the controller 120 and to coordinate the operation of gesture-enabled audio system 100 as a whole. For example, and without limitation, gestures detected via presence sensor 150 may be processed by control application 124 to modify the audio signals being output via loudspeaker 124 and/or illumination produced by light-emitting device 130. The processing performed by control application 124 may include, for example, and without limitation, filtering, amplification, attenuation, noise cancellation, audio signal processing, light processing, image processing, gesture recognition, proximity calculation and/or other types of visual and/or acoustic processing and enhancements.

I/O devices 122 may include input devices, output devices, and devices capable of both receiving input and providing output. For example, and without limitation, I/O devices 122 may include wired and/or wireless communication devices that send data to and/or receive data from light-emitting devices 130, loudspeakers 140, and/or presence sensor 150 included in gesture-enabled audio system 100. In some embodiments, I/O devices 122 may include one or more microphones configured to acquire acoustic data from the surrounding environment.

Loudspeaker 140 is configured to produce sounds (e.g., music, notifications, voices, etc.) based on signals that are generated by controller 120 and/or on other signals that are transmitted to loudspeaker 124. Although only one loudspeaker 140 is shown in FIG. 1, gesture-enabled audio system 100 may be configured with any number of loudspeakers 140, and such loudspeakers may be associated with any number of audio channels. As noted above, one or more of loudspeakers 140 may be wirelessly coupled to controller 120 or disposed within a common housing of gesture-enabled audio system 100.

Presence sensor 150 is configured to detect a physical presence within a particular region proximate presence sensor 150. In some embodiments, presence sensor includes one or more devices capable of detecting the presence of a user, determining a proximity of the user, and/or determining gestures being performed by one or more users. In such embodiments, presence sensor 150 includes one or more proximity sensors configured to determine a distance between a user and gesture-enabled audio system 100. Alternatively or additionally, in some embodiments, presence sensor 150 includes one or more gesture sensors configured to determine gestures performed by one or more users in a particular region proximate presence sensor 150.

Proximity sensors suitable for use in presence sensor 150 include, without limitation, visible light sensors, thermal imaging sensors, laser based devices, ultrasonic sensors, infrared sensors, radar sensors, and/or depth sensors or depth camera systems, such as time-of-flight sensors, structured light sensors, electromagnetic-field-based sensing systems, light detection and ranging (LIDAR) systems, pixel-based laser scanning systems, and the like. Suitable depth sensors or depth camera systems include stereoscopic depth camera systems and time-of-flight-based depth camera systems.

Gesture-detection sensors suitable for use in presence sensor 150 include, without limitation one or more of the above-described proximity sensors employed in conjunction with an appropriate gesture detection algorithm. In some embodiments, such a gesture detection algorithm is implemented in a processor associated with presence sensor 150, whereas in other embodiments, the gesture detection algorithm is implemented in controller 120. Furthermore, any other technically feasible gesture-sensor system may be included in presence sensor 150. In embodiments in which presence sensor 150 includes one or more gesture sensors, gestures performed by a user can be determined by tracking the position and/or orientation of the arms, hands, fingers, joints, head, facial features, etc. of the user(s).

In some embodiments, presence sensor 150 is wirelessly connected to controller 120. In such embodiments, presence sensor 150 can be a wearable computing device, such as a smart ring, smart watch, smart headphone system, or any other wearable computing device that is capable of collecting and transmitting user motion data to controller 120 and/or collecting user motion data and determining a user gesture based thereon. Thus, in such embodiments, presence sensor 150 may be configured to either perform the gesture determination calculations locally or transmit motion data to controller 120 to perform the gesture determination calculations.

Light-emitting device 130 may include any technically feasible device capable of producing light, including, without limitation, light-emitting diodes (LEDs), incandescent lamps, lasers, arc lamps, gas-discharge lamps, and the like. In addition, light-emitting device 130 includes one or more light-producing devices capable of emitting a variable light output in response to various criteria. Such criteria can include, without limitation, the detection of a particular gesture being performed by a user proximate gesture-enabled audio system 100, the detection of a user within an interaction region, in which gestures performed by the user can be recognized and interpreted by gesture-enabled audio system 100, and the detection of a user within a tracking region, which is located further from gesture-enabled audio system 100 than the interaction region.

For example and without limitation, in some embodiments the variable light output may include a selectable brightness level. Thus, the brightness of light emitted by light-emitting device 130 can be increased or decreased in response to various criteria. In such embodiments, light-emitting device 130 may include one or more light-producing devices capable of emitting a variable brightness, such as a controllable output incandescent lamp, LED, etc. Alternatively or additionally, in such embodiments, light-emitting device 130 may include multiple fixed brightness devices, and the variable light output is generated by activating more or fewer of the multiple fixed brightness devices. That is, in such embodiments, light-emitting device 130 includes an array of fixed brightness devices, and the configuration of light-emitting devices that are activated varies in response to one or more criteria.

In some embodiments, the variable light output of light-emitting device 130 may include another visible change in the appearance of light emitted by light-emitting device 130 besides or in addition to simply a change in brightness. In such embodiments, light-emitting device 130 may include one or more light-producing devices capable of selectively changing one or more color appearance parameters of emitted light. For example and without limitation, in such embodiments, light-emitting device 130 may include one or more light-producing devices capable of selectively emitting a different hue, colorfulness level, saturation level, and/or lightness level.

For example and without limitation, in such embodiments, light-emitting device 130 may include one or more programmable and/or independently controllable red-green-blue light-emitting diodes (RGB-LEDs). Thus, in response to certain criteria and/or in response to control signals from controller 120, the one or more RGB-LEDs can be caused to gradually or directly switch to a different color, saturation level, and/or lightness level. That is, the light output of light-emitting device 130 can be varied in one or more ways, besides or in addition to brightness. In embodiments in which light-emitting device 130 includes one or more RGB-LEDs, control signals associated with the control thereof may be generated by a dedicated controller that is separate from controller 120. Alternatively, such control functionality may instead be included in controller 120.

In some embodiments, light-emitting device 130 includes an array of multiple independently controlled light-emitting devices, such as RGB-LEDs. Such an array can vary the light output of light-emitting device 130 by creating certain geometrical patterns in response to particular criteria, so that a user can quickly ascertain whether a particular event has taken place and/or whether a particular event is imminent. One such embodiment of gesture-enabled audio system 100 is illustrated in FIG. 2.

Figure 2:
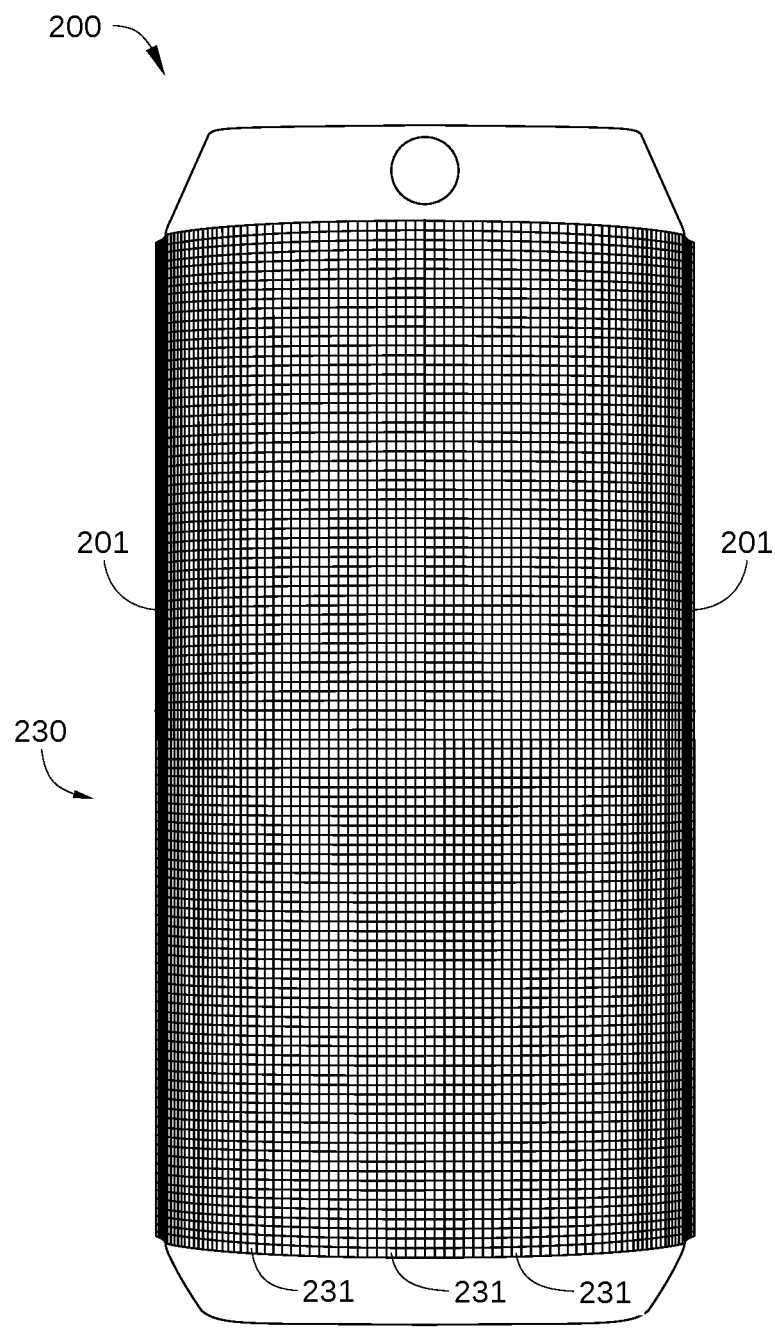
FIG. 2 is a schematic representation of a gesture-enabled audio system, according to one or more embodiments of the present disclosure.

FIG. 2 is a schematic representation of a gesture-enabled audio system 200, according to one or more embodiments of the present disclosure. Gesture-enabled audio system 200 is substantially similar in organization and operation to gesture-enabled audio system 100, and includes an array 230 of independently controllable light-emitting devices 231, such as RGB LEDs or the like. As shown, array 230 covers some or all of a cylindrical surface 201 of gesture-enabled audio system 200, and includes multiple light-emitting devices 231 (e.g., tens or hundreds of light-emitting devices 231). Consequently, array 230 can be employed to provide visual feedback to a user via certain geometrical patterns in response to certain criteria. For instance, in some embodiments, array 230 displays a particular geometrical figure or portion of such a figure, such as a line, circle, rectangle, an open ring, etc., that is partially filled or completed with activated light-emitting devices 231, where the amount by which the geometrical figure is filled or completed with activated light-emitting devices 231 is a function of the currently measured value. For example, and without limitation, in embodiments in which array 230 is configured to indicate a detected proximity of a user to gesture-enabled audio system 200, the geometric figure may be displayed with more activated light-emitting devices 231 as the user is determined to be closer to a particular threshold distance from gesture-enabled audio system 200, such as a distance at which gesture-enabled audio system 200 can accurately detect and respond to physical gestures of the user as commands. Thus, when the user is determined by controller 120 to be equal to or closer than the threshold distance from gesture-enabled audio system 200, the geometric figure is displayed as completed (e.g., an open ring is closed) or as a completely filled shape (e.g., a circle or square). In embodiments in which array 230 is configured to cover substantially all of cylindrical surface 201, multiple instances of the geometric shape or figure can be displayed on different portions of cylindrical surface 201. Thus, in such embodiments, the visual feedback provided by array 230 that is related to the proximity of the user can be made visible from all sides of gesture-enabled audio system 200.

Alternatively, in some embodiments, all light-emitting devices 231 of array 230 may be activated when controller 120 determines that the user is equal to or closer than the threshold distance from gesture-enabled audio system 200; when the user is at a greater distance than the threshold distance, portions of array 230 are turned off or reduced in brightness, such as the higher portions of array 230; as a user moves further from the threshold distance, lower portions of array 230 are also turned off. It is noted that in such embodiments, when array 230 is configured to cover substantially all of cylindrical surface 201, the visual feedback provided by array 230 that is related to the proximity of the user is visible from all sides of gesture-enabled audio system 200.

In embodiments in which presence sensor 150 includes at least one proximity sensor, a gesture-enabled audio system can be configured to generate a light output that provides feedback to a user to indicate the proximity of the user to the gesture-enabled audio system. In such embodiments, the light output emitted by light-emitting device 130 may be different depending on whether the user is determined to be within an interaction region proximate to the gesture-enabled audio system or within a tracking region that is outside of and adjacent to the interaction region. One such embodiment is illustrated in FIG. 3.

Figure 3:
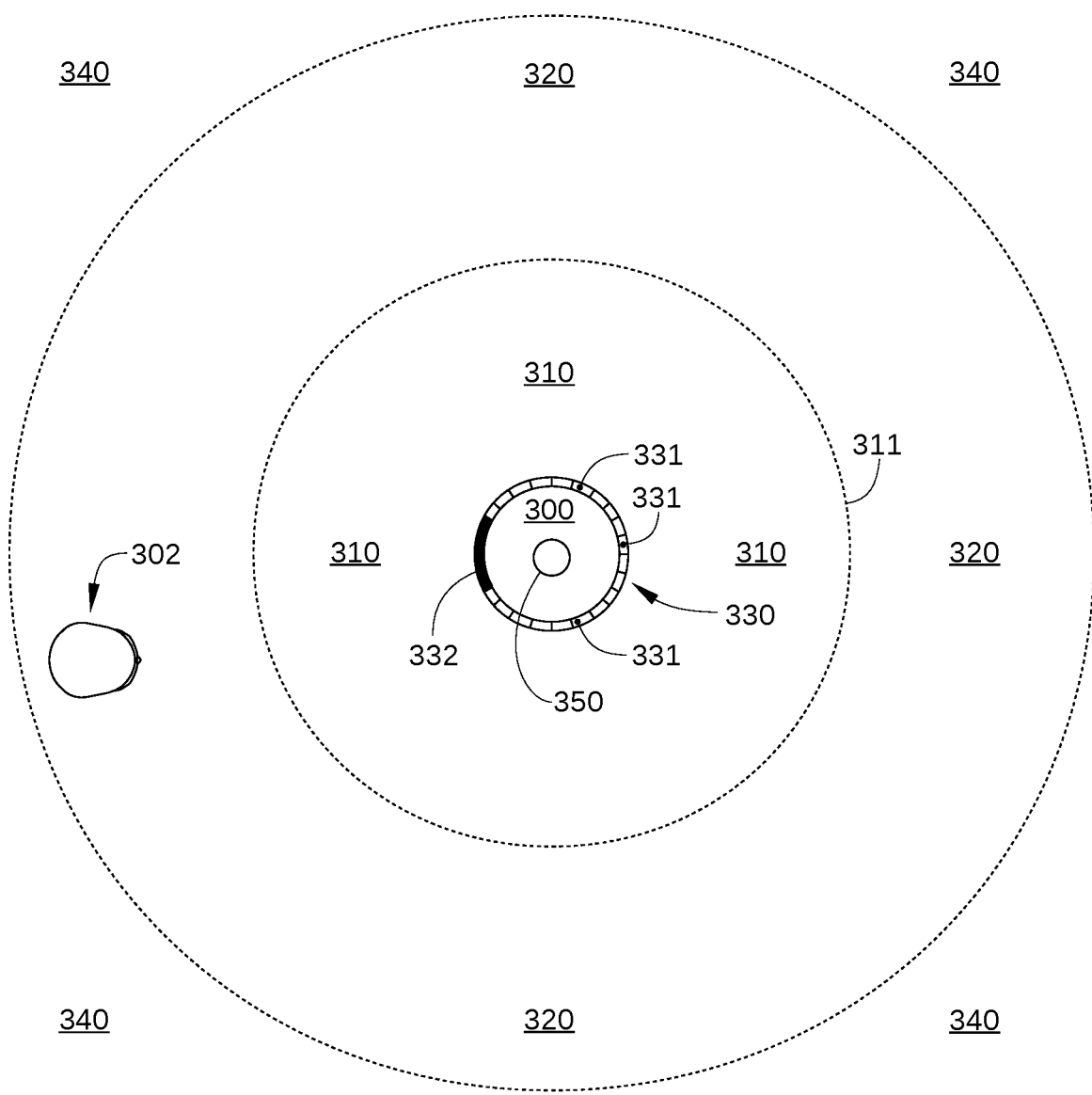
FIG. 3 is a plan view of a gesture-enabled audio system disposed within an interaction region, according to various embodiments of the present disclosure.

FIG. 3 is a plan view of a gesture-enabled audio system 300 disposed within an interaction region 310 and configured according to various embodiments of the present disclosure. As shown, gesture-enabled audio system 300 includes an array 330 of independently controllable light-emitting devices 331, such as RGB LEDs or the like, which extends around the periphery of gesture-enabled audio system 300. For example, and without limitation, in some embodiments array 330 may be similar in configuration to array 230 in FIG. 2. In addition, gesture-enabled audio system 300 includes a presence sensor 350 that is configured with one or more proximity sensors and gesture sensors as described above with respect to presence sensor 150 in FIG. 1. Thus, gesture-enabled audio system 300 is configured to determine a proximity of a user 302, to detect gestures performed by user 302 when in interaction region 310, and to provide appropriate visual feedback via array 330 to user 302.

In operation, when user 302 enters tracking zone 320 from a non-interaction region 340, presence detector 350 detects the physical presence of user 302. Controller 120 then causes array 330 to generate a light output that provides feedback to user 302 indicating the proximity of user 302 to, for example and without limitation, interaction region 310. The light output may be any of those described above, such as activation of a portion of independently controllable light-emitting devices 331, where the portion that is activated is proportional or otherwise related to the proximity of user 302 to a threshold distance 311 from gesture-enabled audio system 300. Thus, as user 302 moves closer to threshold distance 311, the light output from array 330 changes. For example, more of independently controllable light-emitting devices 331 could be activated, a color emitted by array 330 could be modified, a geometric figure could be incrementally filled or completed, etc. In such embodiments, when user 302 crosses threshold distance 311, a discrete change in the visual output from gesture-enabled audio system 300 may take place, thereby indicating that user 302 can now issue gesture-based commands to gesture-enabled audio system 300. For example and without limitation, a geometric figure, such as a ring, could be completed; a color appearance parameter of light emitted from gesture-enabled audio system 300 could suddenly change (e.g., a hue of such emitted light changes to a significantly different hue); one or more of independently controllable light-emitting devices 331 could begin to blink or flash; etc. However, in various embodiments, any of the visual changes disclosed herein could be implemented when user 302 crosses threshold distance 311.

Once user 302 is within interaction region 310, physical gestures performed by user 302 can be recognized and interpreted by controller 320, via presence detector 350, including hand gestures, arm gestures, finger gestures, facial gestures, head gestures, movements of a wearable computing devices, such as a smart ring, smart watch, smart headphone system, and the like. In response to such a gesture being detected by gesture-enabled audio system 300, controller 120 can cause array 330 to emit an appropriate visual output that is visible to user 302, thereby providing immediate feedback that the gesture performed was detected and recognized. In some embodiments, a specific visual output may be emitted by array 330 for each such gesture that controller 120 can recognize. Alternatively or additionally, a specific visual output may be emitted by array 330 indicating a particular command is being performed in response to a gesture.

In some embodiments, presence sensor 350 is configured to detect a user for 360° around gesture-enabled audio system 300 and array 330 is configured to emit light for 360° around gesture-enabled audio system 300, as shown. In such embodiments, interaction region 310 and tracking region 320 are generally circular. In such embodiments, array 330 can provide the appropriate visual output to user 302 by activating independently controllable light-emitting devices 331 of array 330 that face user 302, e.g., user-facing light-emitting device 332 (solid).

In some embodiments, the placement of a presence sensor in a gesture-enabled audio device may not allow for a 360° interaction zone around the audio device. One such embodiment is illustrated in FIG. 4.

Figure 4:
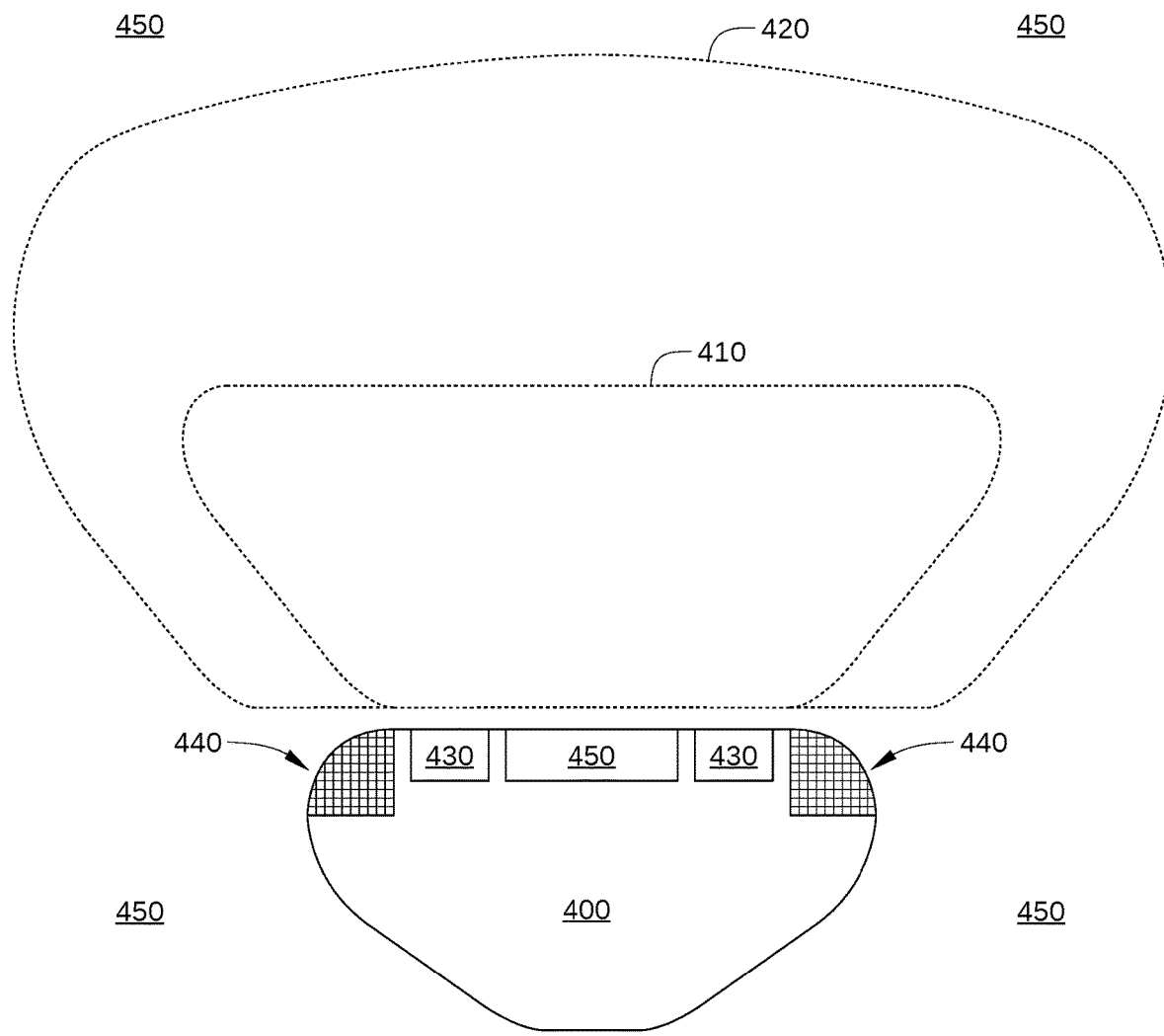
FIG. 4 is a plan view of a gesture-enabled audio system that is disposed within an interaction region and a tracking region, according to various embodiments of the present disclosure.

FIG. 4 is a plan view of a gesture-enabled audio system 400 that is disposed proximate to an interaction region 410 and a tracking region 420, and is configured according to various embodiments of the present disclosure. Gesture-enabled audio system 400 includes loudspeakers 440, an array 430 of independently controllable light-emitting devices, and a presence sensor 450 that is configured with one or more proximity sensors and gesture sensors as described above with respect to presence sensor 150 in FIG. 1. In the embodiment illustrated in FIG. 4, presence sensor 450 is directed toward the same area into which loudspeakers 440 direct audio output. Thus, interaction region 410 and tracking region 420 are located on one side of gesture-enabled audio system 400, as shown. Otherwise, gesture-enabled audio system 400 is substantially similar in operation to gesture-enabled audio system 300 when a user enters tracking zone 420 from a non-interaction region 450, and when the user enters interaction region 410 from tracking region 420.

Figure 5:
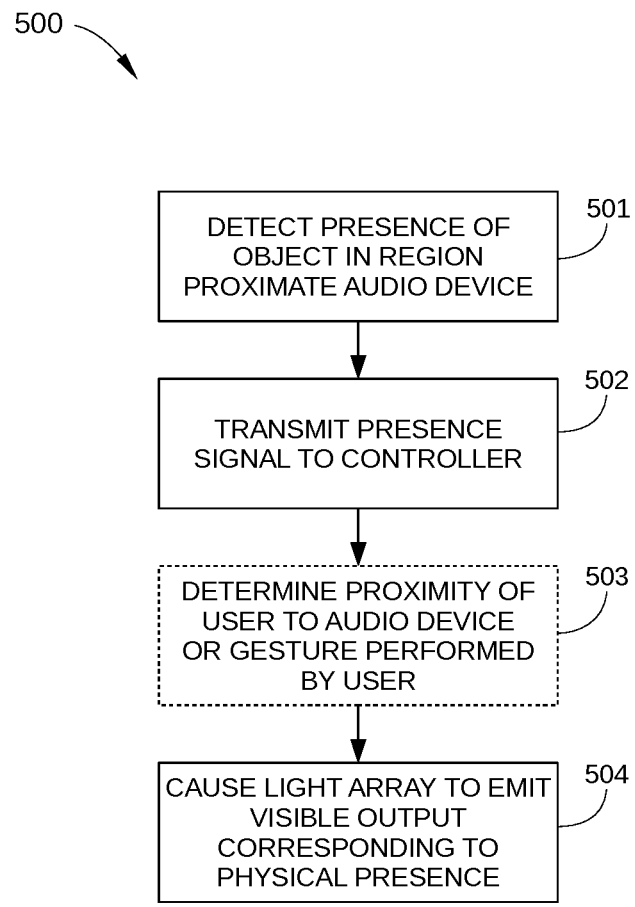
FIG. 5 sets forth a flowchart of method steps for generating visual feedback from a gesture-enabled audio device, according to various embodiments of the present disclosure.

FIG. 5 sets forth a flowchart of method steps for generating visual feedback from a gesture-enabled audio device, according to various embodiments of the present disclosure. Although the method steps are described with respect to the systems of FIGS. 1-4, persons skilled in the art will understand that any system configured to perform the method steps, in any order, falls within the scope of the various embodiments.

As shown, a method 500 begins at step 501, in which presence sensor 350 detects the presence of an object, such as user 302, in a region proximate gesture-enabled audio system 300, such as interaction region 310 or tracking region 320. When user 302 is in tracking region 320, detecting the object can include determining the proximity of user 302 to gesture-enabled audio system 300. When user 302 is in interaction region 310, detecting the object can include detecting a gesture performed by user 302.

In step 502, presence sensor 350 transmits a presence signal that includes one or more values associated with the object to controller 120, via a wireless or wired connection. When user 302 is in tracking region 320 of gesture-enabled audio system 300, the presence signal may include a value associated with object proximity to gesture-enabled audio system 300, such as a distance of user 302 from gesture-enabled audio system 300. When user 302 is in interaction region 310 of gesture-enabled audio system 300, the presence signal may include a value associated with object proximity and/or one or more values representing motion information associated with a particular gesture performed by user 302. In embodiments in which presence sensor 350 is communicatively coupled to controller 120 via a wireless connection, such as when presence sensor 350 is a wearable computing device worn by user 302, presence sensor 350 transmits the presence signal to controller 120 over the wireless connection. In embodiments in which presence sensor 350 is communicatively coupled to controller 120 via a wired connection, presence sensor 350 transmits the presence signal to controller 120 over the wired connection.

In optional step 503, when user 302 is in tracking region 320, controller 120 determines a proximity of user 302 to gesture-enabled audio system 300, based on information included in the presence signal. When user 302 is in interaction region 310, controller 120 determines which physical gesture is performed by user 302, based on information included in the presence signal. Alternatively, presence sensor 350 includes logic and/or programming configured to determine the proximity of user 302 to gesture-enabled audio system 300 and/or to determine a gesture performed by user 302. In such embodiments, step 503 is not performed.

In step 504, in response to receiving the presence signal, controller 120 causes array 330 to emit a particular light output that corresponds to the physical presence. For example, when user 302 is in tracking region 320, the light output could include a variable light output that varies as a function of the proximity of user 302 to gesture-enabled audio system 300. When user 302 is in interaction region 310, the particular light output includes at least one of a light output confirming controller 120 received the presence signal or a light output indicating that controller 120 is performing a particular action in response to the presence signal.

For example and without limitation, in response to certain physical gestures, signal controller 120 may perform such actions as modifying the playback of music or other audio content by controlling audio device operations. Specifically, such operations may include, without limitation, audio output volume, playing/pausing of audio content, selection of music tracks (next/previous song, next/previous playlist/radio station, etc.), changing into or out of shuffle mode, modifying metadata associated with the currently playing audio content, such as marking the currently playing audio content as a preferred selection, associating a like/dislike or other rating with the currently playing audio content, and the like. In some embodiments, in step 504, controller 120 also causes loudspeaker 140 to emit an audible cue (tone, beep, user-selected sound effect, or other audible notification) indicating the controller has received the presence signal.

In sum, various embodiments set forth systems and techniques for generating visual feedback from a gesture-enabled audio device. A gesture-enabled audio device is configured to detect the physical presence of a user and/or a user gesture, and to generate an appropriate light output to the user in response. By detecting the proximity of a user via a proximity sensor, the gesture-enabled audio device can generate a variable light output that changes as a function of user proximity, thereby visually informing the user whether physical gestures can currently be recognized by the audio device. By detecting physical gestures performed by the user via a gesture sensor, the gesture-enabled audio device can generate a light output that confirms detection of the gesture and/or indicates that the controller is performing a particular action in response to the physical gesture.

At least one advantage of the disclosed embodiments is that a user can determine at a glance whether the user's current position relative to a gesture-enabled audio device will allow gesture-based inputs to the gesture-enabled device. A further advantage is that gesture-based interactions with a gesture-enabled audio device are more reliable due to the visual feedback provided by the device. For example, the visual feedback can confirm recognition of a gesture as an input and/or indicate which command has been received by the device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. An audio device, comprising:
    a sensor communicatively coupled to a processor and configured to generate a presence signal in response to detecting a user within a tracking region or an interaction region;
    a loudspeaker communicatively coupled to the processor;
    at least one light-emitting device that is communicatively coupled to the processor; and
    the processor, wherein the processor:
        when the user is within the tracking region, generates a first visual output that varies light output of the at least one light-emitting device based on the presence signal, and
        when the user is within the interaction region, generates a second visual output to indicate that the audio device is ready to receive a gesture-based command.

2. The audio device of claim 1, wherein detecting the user within the tracking region comprises determining a proximity of the user to the audio device, and the first visual output as a function of the proximity.

3. The audio device of claim 1, wherein detecting the user within the interaction region comprises detecting a gesture performed by a user in the interaction region, and the second visual output comprises at least one of a light output confirming that the gesture has been detected or a light output indicating that the processor is performing a first action in response to the presence signal.

4. The audio device of claim 3, wherein the first action comprises modifying at least one aspect of audio content that is being outputted via the loudspeaker.

5. The audio device of claim 3, wherein the processor, in response to the gesture, causes the loudspeaker to emit an audible cue indicating that the processor received the presence signal.

6. The audio device of claim 1, wherein the sensor is communicatively coupled to the processor via a wireless connection.

7. The audio device of claim 6, wherein the sensor comprises a wearable computing device configured to transmit the presence signal to the processor in response to a gesture performed by a user wearing the wearable computing device.

8. The audio device of claim 1, wherein the processor causes the at least one light-emitting device to emit the first visual output or the second visual output with one or more of a particular hue that is based on the presence signal, a particular colorfulness level that is based on the presence signal, a particular saturation level that is based on the presence signal, a particular brightness level that is based on the presence signal, or a particular lightness level that is based on the presence signal.

9. The audio device of claim 1, wherein the at least one light-emitting device comprises an array of multiple independently controlled light-emitting devices.

10. The audio device of claim 9, wherein the processor causes the array of multiple independently controlled light-emitting devices to emit the first visual output or the second visual output with a particular configuration of activated light-emitting devices in the array that is based on the presence signal.

11. The audio device of claim 10, wherein each of the multiple independently controlled light-emitting devices comprises a programmable red-green-blue light-emitting diode (RGB-LED).

12. The audio device of claim 10, wherein the processor causes the at least one light-emitting device to emit the first visual output or the second visual output by causing the activated light-emitting devices in the array to fill a geometric shape based on a value of the presence signal.

13. The audio device of claim 10, wherein the processor causes the at least one light-emitting device to emit the first visual output or the second visual output based on the presence signal by causing the activated light-emitting devices in the array to increase a size of a geometric shape based on a value of the presence signal.

14. The audio device of claim 9, wherein the processor:
    determines a direction of the user with respect to the array of multiple independently controlled light-emitting devices, and
    causes the array of multiple independently controlled light-emitting devices to emit the light output via a configuration of activated light-emitting devices in the array that is oriented toward the direction of the user.

15. A method for generating visual feedback from an audio device, the method comprising:
    detecting presence of a user within a tracking region or an interaction region of the audio device;

determining a value associated with the presence of the user;

when the user is within the tracking region, causing one or more light-emitting devices to emit a first light output based on proximity of the user as indicated by the value; and when the user is within the interaction region, causing the one or more light-emitting devices to emit a second light output to indicate that the audio device is ready to receive a gesture-based command.

16. The method of claim 15, wherein determining the value associated with the presence of the user comprises determining a proximity of the user to the audio device.

17. The method of claim 15, wherein the user comprises a user and determining the value associated with the presence of the user comprises determining a particular gesture performed by the user.

18. The method of claim 15, wherein the one or more light-emitting devices are included in the audio device.

19. One or more non-transitory computer-readable storage media medium including instructions that, when executed by one or more processors, configure the one or more processors to generate visual feedback from an audio device by performing steps of:

detecting presence of a user within a tracking region or an interaction region of the audio device;

determining a value associated with the presence of the user;

when the user is within the tracking region, causing one or more light-emitting devices to emit a first light output based on proximity of the user as indicated by the value; and when the user is within the interaction region, causing the one or more light-emitting devices to emit a second light output to indicate that the audio device is ready to receive a gesture-based command.

20. The one or more non-transitory computer-readable storage media of claim 19, wherein the one or more processors cause the one or more light-emitting devices to emit the first light output with one or more of a particular hue that is based on the value, a particular colorfulness level that is based on the value, a particular saturation level that is based on the value, a particular brightness level that is based on the value, or a particular lightness level that is based on the value.

* * * * *

UNITED STATES PATENT AND TRADEMARK OFFICE
CERTIFICATE OF CORRECTION

PATENT NO. : 10,685,550 B2  
APPLICATION NO. : 16/301424  
DATED : June 16, 2020  
INVENTOR(S) : Joseph Verbeke et al.

Page 1 of 1

It is certified that error appears in the above-identified patent and that said Letters Patent is hereby corrected as shown below:

On the Title Page

(73) Assignee:
Please delete "Harman International Industries, Incorporated, Stamford, CT (US)" and insert
--Harman International Industries, Incorporated, Stamford, CT (US); Google Inc., Mountain View, CA (US)--;

In the Claims

Column 13, Claim 19, Line 20, please delete "medium".

Signed and Sealed this
Twenty-fourth Day of November, 2020

Andrei Iancu
*Director of the United States Patent and Trademark Office*